United States Patent [19]

Newman

[11] Patent Number: 4,820,209
[45] Date of Patent: Apr. 11, 1989

[54] TORQUE CONVERTER MARINE TRANSMISSION WITH VARIABLE POWER OUTPUT

[75] Inventor: Neil A. Newman, Omro, Wis.

[73] Assignee: Brunswick Corporation, Skokie, Ill.

[21] Appl. No.: 118,862

[22] Filed: Nov. 9, 1987

[51] Int. Cl.$^4$ ............................................. B63H 23/26
[52] U.S. Cl. ........................................ 440/74; 74/330;
74/361; 74/730; 192/4 R; 440/75
[58] Field of Search ................... 440/74, 75; 192/4 R;
74/361, 730, 330

[56] References Cited

U.S. PATENT DOCUMENTS

| | | | |
|---|---|---|---|
| 678,228 | 7/1901 | Cormier | 440/74 |
| 3,407,600 | 10/1968 | Meyer | 60/54 |
| 3,557,743 | 1/1971 | Rubis | 440/74 |
| 4,305,710 | 12/1981 | Schneider | 440/75 |
| 4,558,769 | 12/1985 | Neisen | 192/3.31 |

*Primary Examiner*—Sherman D. Basinger
*Attorney, Agent, or Firm*—Andrus, Sceales, Starke & Sawall

[57] ABSTRACT

A fluid coupling is provided in a marine drive between the engine and the propulsion unit. The fluid coupling includes a fluid pump adapted to be driven by the crankshaft of the engine, and a turbine adapted to be driven by the fluid pump. A series of reactor vanes is provided in the fluid coupling. The reactor vanes are adapted to be driven in a direction opposite the direction of rotation of the fluid pump. The turbine and the reactor vanes are connected to shafts which extend from the fluid coupling to a transmission housing. Each shaft is provided with a gear and a brake disc. An output shaft extends from the transmission housing, and includes a pair of freely rotatable gears engageable with the gears on the reactor shaft and the turbine shaft. Clutch mechanisms are provided on the freely rotatable output shaft gears for selectively engaging the reactor shaft gear and the turbine shaft gear to provide rotation of the output shaft in response to rotation of the reactor shaft and turbine shaft gears. A variable force brake is applied to a disc connected to the output shaft to govern the amount of power transferred by the output shaft to the propulsion unit. The variable force brake is selectively actuable to govern the output of the fluid coupling during low-speed operation to provide increased boat performance at such speeds.

12 Claims, 1 Drawing Sheet

TORQUE CONVERTER MARINE TRANSMISSION WITH VARIABLE POWER OUTPUT

BACKGROUND AND SUMMARY

This invention relates to a transmission system for a marine drive.

In a conventional marine drive, including an engine and a propulsion unit, the engine is directly and mechanically connected to the propeller through a gear box. As a result, the speed of the propeller is directly proportional to the speed of the engine in a ratio established by the gears of the gearbox.

It has been recognized that the usual selection of marine drive characteristics provides unsatisfactory boat performance at low-speed operation, such as for trolling or docking. One mechanism for improving the low-speed performance of the boat is disclosed in my copending patent application Ser. No. 07/096,739 filed Sept. 15, 1987. The structure disclosed in this application provides a fluid coupling apparatus in connection with a series of variable position vanes disposed between the pump and turbine components of the fluid coupling. The vanes are actuable to govern the direction of impingement of fluid on the turbine component of the fluid coupling. The position of the vanes determines the amount of power transferred from the fluid pump to the turbine, to govern the power output of the fluid coupling. The position of the vanes also determines the direction of propulsion of the boat.

The present invention is also directed to a structure for providing improved low-speed operation of a boat. A fluid coupling is provided between the marine drive engine and the gearbox to which the propeller is connected. The fluid coupling includes a rotatable fluid pump connected to the engine and rotatable in response to rotation of the engine crankshaft. A rotatable turbine is driven by the fluid pump. The turbine is connected to a turbine shaft, and is drivingly connected to an output shaft coupled to the propulsion unit for transferring power thereto. A governing means is provided for governing the amount of power transferred from the engine to the propulsion unit. The governing means includes means for varying the amount of power transferred by the output shaft. In one embodiment, the governing means comprises a variable force brake which acts on the output shaft to control its speed of rotation and thereby the amount of power transferred from the engine to the propulsion unit by the output shaft. In order to provide reverse operation of the boat, a series of reactor vanes is provided which is rotatably driven by the fluid pump in a direction opposite to the direction of rotation of the turbine. The reactor vanes are connected to a reactor shaft, which is drivingly connected to the output shaft. Both the turbine shaft and the reactor shaft are provided with a brake mechanism and a clutch mechanism for selectively engaging the respective shafts with the output shaft. In one embodiment, the reactor shaft and the turbine shaft extend from the fluid coupling along a common axis, with one shaft being tubular in cross section and the other shaft extending through the hollow interior of the tube. For forward operation of the boat, a brake is applied to the reactor shaft to maintain it stationary, while the turbine shaft is clutched together with the output shaft to provide rotation thereof and transfer of power from the engine to the propulsion unit, to propel the boat in a forward direction. For reverse operation, a brake is applied to the turbine shaft to maintain it stationary, and the reactor shaft is clutched together with the output shaft to provide rotation thereof and transfer of power from the engine to the propulsion unit to propel the boat in a reverse direction. The variable force brake can be applied to the output shaft, and is capable of overcoming the rotation imparted to the output shaft from either the turbine shaft or the reactor shaft. The variable force brake is operable in response to low-speed boat operation to provide improved brake performance for trolling and/or docking. For high-speed operation where the characteristics of the fluid coupling are undesirable, a clutch is provided to directly connect the fluid pump to the turbine and to thereby eliminate the effect of the fluid coupling.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
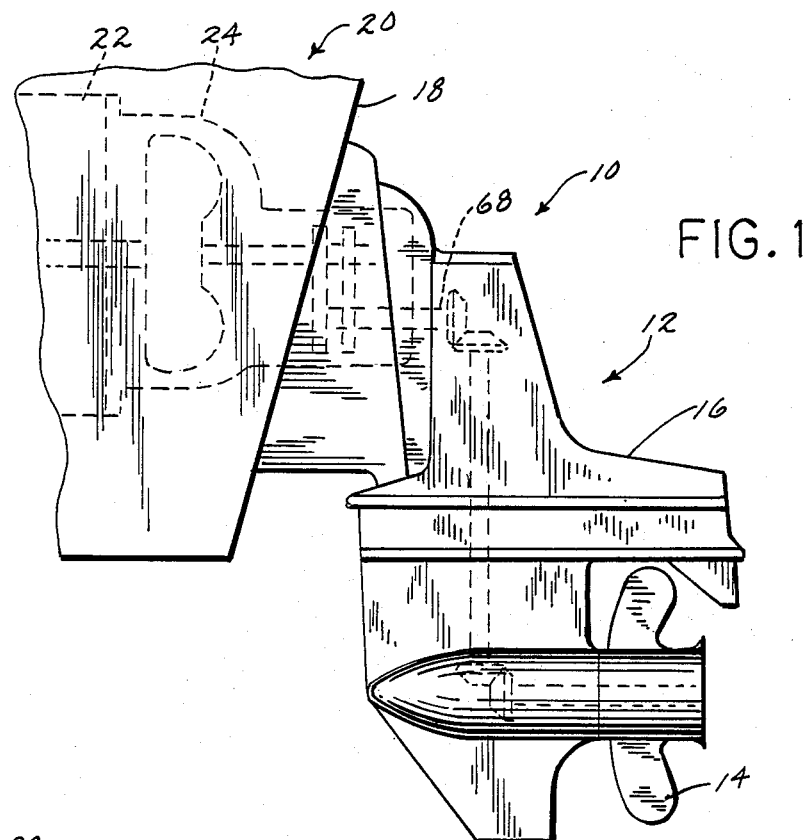
FIG. 1 is a partial elevation view showing the improved marine drive of the present invention.
Figure 2:
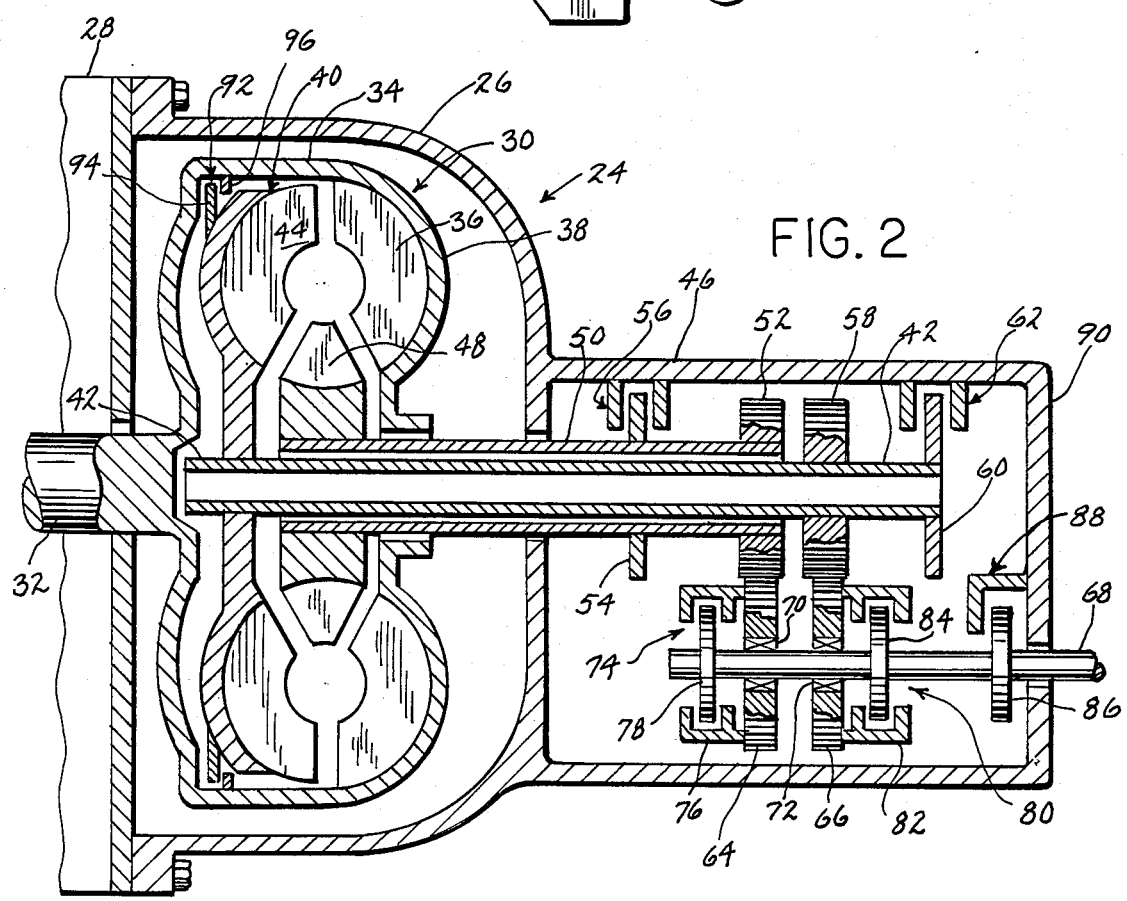
FIG. 2 is a schematic representation of a fluid coupling device constructed according to the present invention.

As shown in FIG. 1, a marine drive 10, shown as an inboard-outboard stern drive, includes a propulsion unit 12 having a propeller 14 and a gearbox 16, as is well known. These elements are mounted on the exterior of transom 18 of a boat 20. An engine 22 of conventional construction is mounted inside boat 20.

In accordance with the present invention, a fluid coupling 24 is interposed between engine 22 and propulsion unit 12. Fluid coupling 24 has a housing 26 bolted or otherwise connected to the crankcase 28 of engine 22. A fluid pump or driving member 30 is coupled to the crankshaft 32 of engine 22 and forms the input shaft of fluid coupling 24. Pump 30 includes a casing 34 containing a torque transmitting hydraulic fluid. Pump 30 also includes a plurality of impeller blades 36 in cup-like frame 38, which circulate hydraulic fluid through casing 34.

A turbine, or driven member, 40 is disposed within casing 34 and connected to a turbine shaft 42. Turbine 40 includes a plurality of blades 44, which are driven by fluid circulated in casing 34 by pump 30. Turbine shaft 42 is driven in response to rotation of turbine blades 44. Turbine shaft 42 extends into the interior of a transmission housing 46, connected to fluid coupling housing 26.

A series of reactor vanes 48 are provided in fluid coupling 24 between pump blades 36 and turbine blades 44. Reactor vanes 48 are curved so as to be driven in a direction opposite the direction of rotation of fluid pump 30 due to the circulation of fluid in casing 34. Reactor vanes 48 are connected to a reactor shaft 50, which extends into the interior of transmission housing 46.

Reactor shaft 50 is a tubular member, and turbine shaft 42 extends through reactor shaft 50. Turbine shaft 42 and reactor shaft 50 extend along a common axis from fluid coupling housing 26 to the interior of transmission housing 46.

A gear 52 is connected to reactor shaft 50 adjacent its end disposed in the interior of transmission housing 46.

Reactor shaft 50 is also provided with a disc 54 interiorly of transmission housing 46. A caliper type brake mechanism, denoted generally at 56, is connected to the interior of transmission housing 46 and is engageable with disc 54.

Turbine shaft 42 is provided with a gear 58 interiorly of transmission housing 46. A disc 60 is also connected to turbine shaft 42 adjacent its end interiorly of transmission housing 46. A caliper type brake mechanism, denoted generally at 62, is provided on the wall of transmission housing 46 and is engageable with disc 60.

A pair of gears 64, 66 are provided on an output shaft 68. Output shaft 68 extends from transmission housing 46 and is coupled to the propulsion unit 12 to transfer power thereto. Gears 64, 66 are engageable with gears 52 and 58, respectively. Gears 64 and 66 are provided with bearings 70, 72, respectively, where gears 64, 66 are mounted to output shaft 68 to provide free rotation of gears 64, 66 thereabout.

Gear 64 is provided with a clutch mechanism 74 having a caliper 76 engageable with a disc 78 mounted on output shaft 68. Clutch mechanism 74 is selectively operable to engage disc 78 and to provide rotation of output shaft 68 in response to rotation of reactor shaft gear 52. Likewise, gear 66 is provided with a clutch mechanism 80 having a caliper 82 engageable with a disc 84 mounted on output shaft 68. Clutch mechanism 80 is selectively operable to engage disc 82 and to provide rotation of output shaft 68 in response to rotation of turbine shaft gear 58.

As a means for selectively variably controlling or governing the power transferred from fluid coupling 24 through the transmission, a disc 86 is mounted to output shaft 68 and a variable force brake mechanism, shown generally at 88, is provided adjacent end wall 90 of transmission housing 46. Variable force brake 88 is selectively engageable with output shaft disc 86 to variably govern the speed of rotation of output shaft 68 as it is driven either by reactor shaft gear 52 or turbine shaft gear 58. Variable force brake 88 is capable of exerting sufficient force on disc 86 to overcome rotation imparted to output shaft 68 by either of gears 52 or 58.

In operation, to propel boat 20 in a forward direction, brake mechanism 56 is applied to reactor shaft disc 54 to prevent rotation of reactor shaft gear 52. Upon rotation of fluid pump 30 by crankshaft 32, turbine 44 is rotated by the action of fluid contained within casing 34. Rotation of turbine 40 causes rotation of turbine shaft 42 and its associated gear 58. Clutch mechanism 80 is then actuated so as to engage caliper 82 with disc 84 and to lock gear 66 to output shaft 68. In this manner, rotation of turbine shaft 42 is transferred to output shaft 68 via turbine shaft gear 58 and gear 66, in combination with clutch mechanism 80. At selected low engine speeds, variable force brake 88 is applied to variably control the speed of rotation of output shaft 68, and thereby the amount of power transferred by output shaft 68 to propulsion unit 12. This action of variable force brake 88 allows improved low-speed boat operation. Further, reactor member brake 56 can be released to allow the reactor member 48 to free wheel to further reduce the efficiency of fluid coupling 24. As engine speed increases, the force exerted on disc 86 by variable force brake 88 is decreased and brake 56 is engaged, thus allowing acceleration of the boat in response to increased engine speed.

To operate boat 20 in a reverse direction, brake mechanism 62 is applied to disc 60 to thereby prevent rotation of turbine shaft 42. Brake mechanism 56 is released from reactor shaft disc 54, and clutch mechanism 74 on gear 64 is engaged with disc 76 to interconnect reactor shaft 50 with output shaft 68 via gears 52 and 64. Upon rotation of fluid pump 30, reactor vanes 48 are driven in a rotational direction opposite to the direction of rotation of pump 36. Such reverse direction of rotation of reactor vanes 48 causes rotation of reactor shaft 50. Through gears 52 and 64, such rotation of reactor shaft 50 is transferred to output shaft 68 by means of clutch mechanism 74. During low-speed operation of boat 20, variable force brake 88 is selectively applied to disc 86 to variably control the speed of rotation of output shaft 68 and thereby the amount of power transferred to propulsion unit 12. Further, brake 62 could be released to allow turbine 40 to free wheel and reduce pump efficiency.

When boat 20 is operated at high-speed or other conditions during which the characteristics of fluid coupling 24 are undesirable, fluid pump 30 and turbine 40 can be directly mechanically connected by means of a clutch mechanism 92. A clutch mechanism such as 92 is described in U.S. Pat. No. 4,558,769 to Neisen. An annular lock-up clutch plate 94 is provided on turbine 40 and is engageable with an opposing lock-up clutch plate 96 provided on casing 34 of fluid pump 30. Upon engagement of clutch plate 94 with clutch plate 96, fluid pump 30 and turbine 40 are directly mechanically connected so as to operate in a 1:1 relation. During such operation, clutch mechanism 80 is engaged with disc 82 to provide rotation of output shaft 68 in response to rotation of turbine shaft 42. The reactor shaft 50 is left to freely rotate during the lock-up condition, but will not affect the amount of power transferred to output shaft 68.

Various modes of carrying out the invention are contemplated as being within the scope of the following claims particularly pointing out and distinctly claiming the subject matter regarded as the invention.

I claim:

1. In a marine drive for a boat, said marine drive including an engine having a rotatable crankshaft, and a propulsion unit, the improvement comprising:

a fluid coupling interposed in the marine drive between the engine and the propulsion unit, said fluid coupling including a rotatable fluid pump rotatable in resposne to rotation of the engine crankshaft, a rotatable turbine adapted to be driven by said fluid pump in a first rotational direction, and a rotatable reactor adapted to be driven by said fluid pump in a second rotational direction;

a turbine shaft interconnected with said rotatable turbin and adapted to be driven in response to rotation of said rotatable turbine;

a reactor shaft interconnected with said rotatable reactor and adapted to be driven in response to rotation of said rotatable reactor;

wherein one of said shafts is tubular in cross section, and wherein the other of said shafts is disposed in the interior of said tubular shaft;

output means comprising a rotatable output shaft for transferring power from said engine to said propulsion unit;

coupling means for selectively coupling said turbine shaft or said reactor shaft to said output shaft for selectively providing rotation of said output shaft in either a first or second rotational direction; and governing means acting on said output shaft for governing the power transferred from said engine to said propulsion unit, said governing means including means for variably controlling the power output of said output shaft.

2. In a marine drive for a boat, said marine drive including an engine having a rotatable crankshaft, and a propulsion unit, the improvement comprising:
- a fluid coupling interposed in the marine drive between the engine and the propulsion unit, said fluid coupling including a rotatable fluid pump rotatable in response to rotation of the engine crankshaft, a rotatable turbine adapted to be driven by said fluid pump in a first rotatable direction, and a rotatable reactor adapter to be driven by said fluid pump in a second rotational direction;
- a turbine shaft interconnected with said rotatable turbin and adapted to be driven in response to rotation of said turbine;
- output means comprising an output shaft for transferring power from said engine to said propulsion unit;
- means for selectively engaging said turbine shaft with said output shaft;
- coupling means disposed between said reactor and said output shaft for selectively engaging said reactor to said output shaft;
- wherein engagement of said turbine shaft with said output shaft drives said boat in a forward direction, and engagement of said reactor with said output shaft drives said boat in a reverse direction; and
- governing means acting on said output shaft for governing the power transferred from said engine to said propulsion unit, said govening means including means for variably controlling the power output of said output shaft.

3. The invention according to claim 2, wherein said means for selectively engaging said turbine shaft with said output shaft comprises clutch means disposed between said turbine shaft and said output shaft and selectively operable for driving said output shaft in response to rotation of said turbine shaft.

4. The invention according to claim 2, wherein said rotatable reactor drives a reactor shaft and further comprising brake means for preventing rotation of said reactor shaft during rotation of said turbine shaft.

5. In a marine drive for a boat, said marine drive including an engine having a rotatable crankshaft, and a propulsion unit, the improvement comprising:
- a fluid coupling interposed in the marine drive between the engine and the propulsion unit, said fluid coupling including a rotatable fluid pump rotatable in response to rotation of the engine crankshaft, a rotatable turbine adapted to be driven by said fluid pump in a first rotational direction, and a rotatable reactor adapted to be driven by said fluid pump in a second rotational direction;
- a reactor shaft interconnected with said rotatable reactor and adapted to be driven in response to rotation of said reactor;
- a turbine shaft interconnected with said rotatable turbine and adapted to be driven in response to rotation of said turbine;
- output means comprising an output shaft for transferring power from said engine to said propulsion unit;
- means for selectively engaging said turbine shaft with said output shaft;
- means for selectively engaging said reactor shaft with said output shaft;
- wherein engagement of said turbine shaft with said output shaft drives said boat in a forward direction, and engagement of said reactor shaft with said output shaft drives said boat in a reverse direction; and
- governing means acting on said output shaft for governing the power transferred from said engine to said propulsion unit, said governing means including means for variably controlling the power output of said output shaft.

6. The invention according to claim 5, wherein said means for selectively engaging said reactor shaft with said output shaft comprises clutch means disposed between said reactor shaft and said output shaft and selectively operable for driving said output shaft in response to rotation of said reactor shaft.

7. The invention according to claim 6, further comprising brake means for preventing rotation of said turbine shaft during rotation of said reactor shaft.

8. The invention according to claim 2, further comprising selectively operable clutch means for providing a mechanical connection of said rotatable fluid pump to said turbine means to bypass said fluid coupling during predetermined operating conditions.

9. In a marine drive for a boat, said marine drive including an engine and a propulsion unit, the improvement comprising:
- a fluid coupling interposed in the marine drive between the engine and the propulsion unit, said fluid coupling including a rotatable fluid pump connected to the engine and rotatable turbine means adapted to be driven by said fluid pump and including a turbine shaft drivingly connectable to a rotatable output shaft for driving said boat in a forward direction, said fluid coupling further comprising reactor means adapted to be driven by said fluid pump and drivingly connectable to said output shaft for driving said boat in a reverse direction;
- selectively engageable turbine coupling means between said turbine shaft and said output shaft for selectively engaging said turbine shaft with said output shaft to provide forward propulsion of said boat; and
- governing means for governing the power transferred from said engine to said propulsion unit by said output shaft, said governing means acting on said output shaft and including means for variably controlling the speed of rotation of said output shaft when said output shaft is drivingly connected to and being driven by either said turbine means or said reactor means.

10. The invention according to claim 9, wherein said reactor means drives a reactor shaft, and further comprising selectively engageable reactor coupling means between said reactor shaft and said output shaft for selectively providing reverse propulsion of said boat.

11. The invention according to claim 10, wherein said reactor shaft and said turbine shaft extend along a common axis, and are disposed one within the other.

12. The invention according to claim 9, wherein said governing means comprises a variable force brake adapted to selectively overcome rotation imparted to said output shaft by either said turbine means or said reactor means to variably control the power output of said fluid coupling through said output shaft.

* * * * *

UNITED STATES PATENT AND TRADEMARK OFFICE
CERTIFICATE OF CORRECTION

PATENT NO. : 4,820,209
DATED : April 11, 1989
INVENTOR(S) : Neil A. Newman

It is certified that error appears in the above-identified patent and that said Letters Patent is hereby corrected as shown below:

Column 4, Line 47, Claim 1, delete "resposne" and substitute therefore -- response --; Column 4, Line 53, Claim 1, delete "turbin" and substitute therefore -- turbine --; Column 5, line 18, Claim 2, delete "turbin" and substitute therefore -- turbine --; Column 5, Line 34, Claim 2, delete "govening" and substitute therefore -- governing --.

Signed and Sealed this

Thirtieth Day of April, 1991

Attest:

HARRY F. MANBECK, JR.

Attesting Officer

Commissioner of Patents and Trademarks